(12) United States Patent
Leroy et al.

(10) Patent No.: US 10,030,094 B2
(45) Date of Patent: Jul. 24, 2018

(54) POLYISOCYANURATE-BASED SYNTACTIC COATING FOR OFFSHORE APPLICATIONS

(75) Inventors: Dimitri Leroy, Brussels (BE); Wesley Verbeke, Steenokkerzeel (BE); Thorsten Gurke, Huldenberg (BE)

(73) Assignee: HUNTSMAN INTERNATIONAL LLC, The Woodlands, TX (US)

( * ) Notice: Subject to any disclaimer, the term of this patent is extended or adjusted under 35 U.S.C. 154(b) by 877 days.

(21) Appl. No.: 12/999,492

(22) PCT Filed: Jun. 17, 2009

(86) PCT No.: PCT/EP2009/057506
§ 371 (c)(1),
(2), (4) Date: Dec. 16, 2010

(87) PCT Pub. No.: WO2010/003788
PCT Pub. Date: Jan. 14, 2010

(65) Prior Publication Data
US 2011/0094614 A1    Apr. 28, 2011

(30) Foreign Application Priority Data

Jul. 10, 2008    (EP) .................................... 08160102

(51) Int. Cl.
*C09D 179/04*    (2006.01)
*F16L 9/147*    (2006.01)
(Continued)

(52) U.S. Cl.
CPC ........... *C08G 18/092* (2013.01); *C08G 18/22* (2013.01); *C09D 5/1662* (2013.01); *C09D 7/70* (2018.01);
(Continued)

(58) Field of Classification Search
CPC ...... Y10T 428/2996; Y10T 428/31551; C08G 18/092; C08G 2101/0025; C08G 18/22;
(Continued)

(56) References Cited

U.S. PATENT DOCUMENTS 4,182,816 A    1/1980  Caunt et al.
4,299,924 A *  11/1981 Nomura ............... C08G 18/092
                                                          521/131
(Continued)

FOREIGN PATENT DOCUMENTS

DE        2534274       2/1977
EP      1 375 577       1/2004
(Continued)

OTHER PUBLICATIONS

Lee, Stuart M. Handbook of Composite Reinforcements. Hoboken: John Wiley & Sons, Nov. 1992. Accessed May 14, 2015.*

*Primary Examiner* — Lee E Sanderson
(74) *Attorney, Agent, or Firm* — Huntsman International LLC; Robert Diaz

(57) ABSTRACT

A polyisocyanurate-based coating for offshore applications is provided. The coating is a syntactic coating, obtainable by reacting a polyisocyanate compound with a compound containing isocyanate-reactive hydrogen atoms in the presence of a trimerisation catalyst and hollow objects, at an isocyanate index of at least and preferably more than 2000.

6 Claims, 2 Drawing Sheets

(51) Int. Cl.
   *C08G 18/09*   (2006.01)
   *C08G 18/22*   (2006.01)
   *C09D 5/16*    (2006.01)
   *C09D 175/04*  (2006.01)
   *E21B 36/00*   (2006.01)
   *C09D 7/40*    (2018.01)
   *C08K 7/28*    (2006.01)

(52) U.S. Cl.
   CPC .......... *C09D 175/04* (2013.01); *E21B 36/003* (2013.01); *C08G 2105/02* (2013.01); *C08K 7/28* (2013.01)

(58) Field of Classification Search
   CPC .............. C08G 18/3203; C09D 175/04; C09D 5/1665; E21B 36/003
   USPC .............. 428/36.9, 36.91; 138/145; 523/219; 525/452
   See application file for complete search history.

(56) References Cited

U.S. PATENT DOCUMENTS

| | | | |
|---|---|---|---|
| 4,607,064 A * | 8/1986 | Kuhn et al. | 521/174 |
| 5,175,228 A | 12/1992 | Wang et al. | |
| 5,296,181 A * | 3/1994 | Neuhaus et al. | 264/46.4 |
| 5,523,334 A * | 6/1996 | White et al. | 521/164 |
| 5,525,641 A * | 6/1996 | White et al. | 521/131 |
| 5,534,299 A * | 7/1996 | Eisen | B05D 7/146 264/45.7 |
| 5,547,998 A * | 8/1996 | White et al. | 521/131 |
| 5,762,822 A * | 6/1998 | Tucker | 252/182.2 |
| 5,984,012 A | 11/1999 | Wactor et al. | |
| 6,058,979 A | 5/2000 | Watkins | |
| 6,147,134 A * | 11/2000 | Eling | 521/174 |
| 6,245,826 B1 * | 6/2001 | Wilson et al. | 521/174 |
| 6,346,558 B1 * | 2/2002 | Peters et al. | 521/114 |
| 6,387,447 B1 | 5/2002 | Grimm et al. | |
| 6,869,988 B2 | 3/2005 | Schwartz et al. | |
| 7,070,648 B1 | 7/2006 | Schwartz et al. | |
| 7,261,772 B1 | 8/2007 | Schwartz et al. | |
| 2001/0043996 A1 * | 11/2001 | Yamada | C03B 19/107 428/34.4 |
| 2003/0232899 A1 | 12/2003 | Markusch et al. | |
| 2004/0173938 A1 | 9/2004 | Huntemann et al. | |
| 2007/0141281 A1 | 6/2007 | Eadara et al. | |
| 2007/0240781 A1 | 10/2007 | Huntemann et al. | |
| 2008/0262168 A1 * | 10/2008 | Bleys et al. | 525/452 |
| 2010/0036080 A1 * | 2/2010 | Merkel et al. | 528/65 |
| 2010/0154917 A1 | 6/2010 | Batallas et al. | |
| 2014/0309324 A1 * | 10/2014 | Macken | C08G 18/3203 521/174 |

FOREIGN PATENT DOCUMENTS

| | | |
|---|---|---|
| EP | 1 541 622 | 6/2005 |
| JP | 57/131275 | 8/1982 |
| JP | 2002/294201 | 10/2002 |
| WO | WO 99/03922 | 1/1999 |
| WO | WO 00/75546 | 12/2000 |
| WO | WO 01/32791 | 5/2001 |
| WO | WO 02/102887 | 12/2002 |
| WO | WO 07/085013 | 7/2007 |

* cited by examiner

POLYISOCYANURATE-BASED SYNTACTIC COATING FOR OFFSHORE APPLICATIONS

CROSS-REFERENCE TO RELATED APPLICATIONS

This application is the National Phase of International Application PCT/EP2009/057506 filed Jun. 17, 2009 which designated the U.S. and which claims priority to European App. Serial No. 08160102.3 filed Jul. 10, 2008. The noted applications are incorporated herein by reference.

The present invention relates to polyisocyanurate-based coatings for offshore applications, and a process for providing the same, more particular to syntactic polyisocyanurate-based coatings for offshore applications.

Polyisocyanate-based coatings for offshore applications are known and used e.g. for coating pipelines used for drilling and exploiting oil wells located offshore.

The drilled oil is guided via the pipeline from the well to the oil drilling platform. The oil is preferably kept at an elevated temperature in order to reduce the viscosity of the oil, hence to allow more easy and more economic pumping of the liquid. Operational temperatures of the oil at present are typically about 115° C.

However, as the depth of the sea at locations where new oil wells are located increases, the necessity exists for using higher operational temperatures for drilling of such deep sea wells. This because, during guiding of the oil through the pipeline, though the pipelines are thermally insulated, still thermal energy is lost through the pipelines. As a consequence the oil temperature decreases during transportation in the pipeline. In case the length of the pipeline becomes too long, the oil may get cooled too much, resulting again in higher viscosity, hence higher energy requirements to pump and transport the more viscous oil.

As a consequence, the thermal insulating coatings applied to the pipelines must preferably have a thermal conductivity as low as possible, while being suitable to operate at higher temperatures, preferably up to 200° C. As an example, for deep sea wells, the thermal insulating coating must be suitable to withstand compression pressures of about 200 to 300 bars, due to the water pressure present near the sea bottom at the location of the drilling.

For the presently existing thermal insulating coatings, often syntactic coatings are used, i.e. polymerized coatings comprising hollow objects, such as glass beads, e.g. the coatings disclosed in U.S. Pat. No. 6,387,447. Though the use of glass spheres results in coatings which may withstand higher pressure, the other mechanical properties of syntactic coatings are not always sufficient to meet the higher demands. The lower density of the thermal insulating coatings is a disadvantage when using the coating for thermally insulating objects which are to be used in permanent submarine applications, since they may increase the floating behavior of objects being provided with such coating.

In order to meet the increasing demands of the offshore applications, in particular of deep sea applications, the thermal conductivity is subject of further reduction. Also the mechanical properties of the coating at elevated temperatures, such as up to 200° C., might be insufficient to meet the new requirements.

It is an object of the present invention to provide a thermal insulating coating suitable for use in, in particular, off shore, deep sea applications. It is an advantage of some embodiments of the present invention to provide a thermal insulating coating having a relatively high density, while having a reduced thermal conductivity. It is another advantage of some embodiments of the present invention to show less water take-up at temperatures of 150° C. and 200 bars pressure. It is an advantage of some embodiments of the present invention to provide a thermal insulating coating having improved mechanical properties, suitable to withstand its use in deep sea applications at elevated temperatures, such as sufficiently high modulus and being resistant to continuous operation temperatures of about 200° C.

The above objective is accomplished by a polyisocyanurate-based thermal insulating coating according to the present invention.

According to a first aspect of the present invention, a polyisocyanurate-based coating for offshore applications is provided. The coating is a syntactic coating, the syntactic coating being obtainable by reacting a polyisocyanate compound with a compound containing isocyanate-reactive hydrogen atoms in the presence of a trimerisation catalyst and hollow objects, wherein the isocyanate index (or short iso-index) of the reaction between the polyisocyanate compound and the compound containing isocyanate-reactive hydrogen atoms is at least 2000 and preferably more than 2000.

The term "hollow" with respect to the hollow objects for use in the present invention is to be understood as at least 50% of the enclosed volume being filled with gaseous fluid. Optionally the enclosed volume being only filled with gaseous fluid.

Syntactic coatings comprise hollow objects, typically hollow glass beads, embedded in the resulting polymer, being the reaction product of the polyisocyanate compound with the compound containing isocyanate-reactive hydrogen atoms in the presence of the trimerisation catalyst. Preferred glass beads are Scotchlite S38, Scotchlite S38 HS, Scotchlite S 38 XHS, Scotchlite XLD 3000 and Scotchlite XLD 6000 from 3M.

Preferably the hollow glass beads provide less than 35 wt %, e.g. less than 25wt %, of the syntactic coating. Most preferred, the hollow glass beads provide 5 to 15 wt % of the syntactic coating according to the present invention, the percentage by weight (wt %) being relative to the whole formulation.

Preferably the glass beads are blended with the compound containing isocyanate-reactive hydrogen atoms, when a syntactic coating is provided. Such glass bead filled composition containing isocyanate-reactive hydrogen atoms may comprise further additives such as TEP (tri ethyl phosphate, $(C_2H_5)_3PO_4$), which allows to reduce the viscosity of the glass bead filled compound containing isocyanate-reactive hydrogen atoms.

According to some embodiments of the present invention, the iso-index of the reaction between the polyisocyanate compound and the compound containing isocyanate-reactive hydrogen atoms leading to the polyisocyanurate-based coating of the present invention may be equal or less than 7000, and is preferably in the range of 2000 to 4000, even more preferably 2001 to 3000 or 2001 to 2500 or 2050 to 3000.

Polyisocyanurate-based coatings according to the first aspect of the present invention have some advantages over the presently known thermally insulating coatings when used in offshore applications.

Polyisocyanurate-based coatings according to the first aspect of the present invention may have a relatively high density of more than 0.6 g/cm$^3$, typically in the range of 0.85 g/cm$^3$ to 1.5 g/cm$^3$, e.g. in the range of 0.85 g/cm$^3$ to 1.2 g/cm$^3$.

Optionally fillers, such as inorganic fillers, e.g. high density inorganic fillers (which may have a density of more than 1 g/cm$^3$) may be added.

Polyisocyanurate-based coatings according to the first aspect of the present invention may have a water uptake of less than 5%, even less than 4%, and even less than 3.5%, measured after 1000 hours at 90° C.

Polyisocyanurate-based coatings according to the first aspect of the present invention may have an elongation of more than 10%, even of more than 20% such as in the range of 10 to 50%, and this measured at temperatures of 23° C. using the standard test.

The thermal insulating properties of the polyisocyanurate-based coatings according to the first aspect of the present invention may be less than 0.18 W/mK, typically in the range of 0.10 W/mK to 0.16 W/mK, such as in the range of 0.10 W/mK to 0.13 W/mK, and this measured at temperatures of 20° C. using the standard test ISO08301, performed on a heat flow meter instrument of LASERCOMP.

The maximum peak temperature the polyisocyanurate-based coatings according to the first aspect of the present invention can withstand may range up to 200° C., even up to 250° C. It was noticed that the Young's modulus (measured using DMTA) of polyisocyanurate-based coatings according to the first aspect of the present invention decreases with increasing temperature. However compared with known polyurethane based thermal insulating coatings, the typical drop of the Young's modulus (measured using DMTA) at about 150° C. does not occur for polyisocyanurate-based coatings according to the first aspect of the present invention.

It was noticed that the use of iso-indices of more than 2000, such as in the range of more than 2000 to less than or equal to 4000 influences these properties, and in particular reduces the water uptake, increases the density and provides a suitable elongation, rendering the thermal insulating coating in particular very suitable for offshore applications, in particular for deep sea applications.

It was also noticed that the choice of the iso-index as set out above, has an influence on the water uptake. In general it was found that the higher the iso-index is, the less water is taken up.

The polyisocyanurate-based coating is obtainable by reacting a polyisocyanate compound with a compound containing isocyanate-reactive hydrogen atoms in the presence of a trimerisation catalyst.

Suitable polyisocyanate compounds may comprise any number of polyisocyanates, including but not limited to, toluene diisocyanates (TDI), diphenylmethane diisocyanate (MDI)—type isocyanates, and prepolymers of these isocyanates. Preferably the polyisocyanate compound may have at least two aromatic rings in its structure, and is a liquid product. Polymeric isocyanates having a functionality greater than 2 are preferred.

In case diphenylmethane diisocyanate (also known as methylene diphenyl diisocyanate, and referred to as MDI) is used to provide the coating according to the present invention, the diphenylmethane diisocyanate (MDI) used in the present invention can be in the form of its 2,4'-, 2,2'- and 4,4'-isomers and mixtures thereof, the mixtures of diphenylmethane diisocyanates (MDI) and oligomers thereof known in the art as "crude" or polymeric MDI (polymethylene polyphenylene polyisocyanates) having an isocyanate functionality of greater than 2, or any of their derivatives having a urethane, isocyanurate, allophonate, biuret, uretonimine, uretdione and/or iminooxadiazinedione groups and mixtures of the same.

A low 2,4-isomer content in the MDI is preferred, such as less than 50% and preferably between 2 and 30% 2,4-isomer, based on the total amount of isomers. The percentages are weight percentages. It was noticed that lower 2,4-isomer content increases the Young's modulus (e.g. using DMTA at 200° C.), while the elongation of the coating still may be kept above 10%.

Examples of other suitable polyisocyanates are tolylene diisocyanate (also known as toluene diisocyanate, and referred to as TDI), such as 2,4-TDI and 2,6-TDI in any suitable isomer mixture, hexamethylene diisocyanate (HMDI or HDI), isophorone diisocyanate (IPDI), butylene diisocyanate, trimethylhexamethylene diisocyanate, di(isocyanatocyclohexyl)methane, e.g. 4,4'-diisocyanatodicyclohexylmethane (H$_{12}$MDI), isocyanatomethyl-1,8-octane diisocyanate and tetramethylxylene diisocyanate (TMXDI), 1,5-naphtalenediisocyanate (NDI), p-phenylenediisocyanate (PPDI), 1,4-cyclohexanediisocyanate (CD), tolidine diisocyanate (TODI), any suitable mixture of these polyisocyanates, and any suitable mixture of one or more of these polyisocyanates with MDI in the form of its 2,4'-, 2,2'- and 4,4'-isomers and mixtures thereof, the mixtures of diphenylmethane diisocyanates (MDI) and oligomers thereof.

Preferred polyisocyanate compounds used in the present invention are polymeric or prepolymeric polyisocyanates, such a quasi-prepolymers, semi-prepolymers or full prepolymers, which may be obtained by reacting polyisocyanates, e.g. polyisocyanates as set out above, and preferably MDI-based polyisocyanates, with compounds containing isocyanate-reactive hydrogen atoms. Polymeric polyisocyanates are to be understood as polyisocyanate compounds having an isocyanate value less than 6.5%. Full prepolymers based on polyisocyanates are to be understood as polyisocyanate compounds having an isocyanate value ranging between 6.5% and 12%. Semi-prepolymers are to be understood as polyisocyanate compounds having an isocyanate value ranging between 12 and 22%. Quasi-prepolymers are to be understood as polyisocyanate compounds having an isocyanate value ranging between 22 and 28%. It is understood that also other polyisocyanates, having isocyanate values more than 28% can be used. For a given iso-index, preferably higher isocyanate values are chosen, such as more than or equal to 17.5%, more preferred above 22%, even above 25%. For given iso-indices, such higher isocyanate values, e.g. above 22% or even above 25%, though apparently causing a decrease in density, have a positive effect on the water uptake and thermal conductivity, i.e. a higher isocyanate value tends to decrease the water uptake and the thermal conductivity coefficient.

Examples of compounds containing isocyanate-reactive hydrogen atoms suitable to provide applicable polymeric or prepolymeric polyisocyanates include alcohols, glycols or even relatively high molecular weight polyether polyols and polyester polyols, mercaptans, carboxylic acids such as polybasic acids, amines, ureas and amides. Particularly suitable polymeric or prepolymeric polyisocyanates are reaction products of polyisocyanates with monohydric or polyhydric alcohols.

The polymeric or prepolymeric polyisocyanates are prepared by conventional methods, e.g. by reacting polyhydroxyl compounds which have a molecular weight of from 400 to 5000, in particular mono- or polyhydroxyl polyethers, optionally mixed with polyhydric alcohols which have a molecular weight below 400, with excess quantities of polyisocyanates, for example aliphatic, cycloaliphatic, araliphatic, aromatic or heterocyclic polyisocyanates.

Given as examples of the polyether polyols are polyethylene glycol, polypropylene glycol, polypropylene glycol-ethylene glycol copolymer, polytetramethylene glycol, polyhexamethylene glycol, polyheptamethylene glycol, polydecamethylene glycol, and polyether polyols obtained by ring-opening copolymerisation of alkylene oxides, such as ethylene oxide and/or propylene oxide, with isocyanate-reactive initiators of functionality 2 to 8. Polyester diols obtained by reacting a polyhydric alcohol and a polybasic acid are given as examples of the polyester polyols. As examples of the polyhydric alcohol, ethylene glycol, polyethylene glycol, tetramethylene glycol, polytetramethylene glycol, 1,6-hexanediol, 3-methyl-1,5-pentanediol, 1,9-nonanediol, 2-methyl-1,8-octanediol, and the like can be given. As examples of the polybasic acid, phthalic acid, dimer fatty acid, isophthalic acid, terephthalic acid, maleic acid, fumaric acid, adipic acid, sebacic acid, and the like can be given.

In a particularly preferred embodiment of the invention, polymeric or prepolymeric polyisocyanates may be used as polyisocyanate component having an average functionality of 2 to 2.9, preferably 2.0 to 2.5, a maximum viscosity of 6000 mPa s, and an isocyanate content (or NCO-value) of 6 to 33.6 wt %, preferably 15 to 33.6 wt %. The viscosity is measured using a Brookfield viscosity meter (model DVII) with spindle 21 at a temperature of 25° C.

The polyisocyanurate-based coating is obtainable by reacting such polyisocyanate compound with a compound containing isocyanate-reactive hydrogen atoms in the presence of a trimerisation catalyst.

The second component in the present coating formulation is an isocyanate-reactive compound. As an example, any of the above mentioned compounds containing isocyanate-reactive hydrogen atoms suitable to provide applicable prepolymers can be used.

According to some embodiments of the present invention, a compound containing isocyanate-reactive hydrogen atoms may have an ethylene oxide (EO) content of 0 to 75 wt %.

Preferably the EO content of the polyether polyol ranges from 5 to 30 wt %, most preferred the EO content is about 15 wt %. "wt %" means weight percent, relative to the weight of the compound containing isocyanate-reactive hydrogen atoms.

The provision of the EO content has as a result that the solubility of the trimerisation catalyst is improved, and that a more homogeneous cured coating may be obtained.

Also the compatibility between the polyisocyanate compound and compound containing isocyanate-reactive hydrogen atoms is improved.

Preferably the compound containing isocyanate-reactive hydrogen atoms does not comprise castor oil.

The trimerisation catalyst used to provide the polyisocyanurate-based coating according to the present invention is typically a catalyst that promotes the trimerisation of isocyanates of the polyisocyanate compound.

As trimerisation catalyst all of such known catalysts as tetraalkylammonium hydroxides (e.g. tetramethylammonium hydroxide, tetraethylammonium hydroxide and tetrabutylammonium hydroxide), organic weak acid salts (e.g. tetramethylammonium acetate, tetraethylammonium acetate and tetrabutylammonium acetate), trialkylhydroxyalkylammonium hydroxides (e.g. trimethylhydroxypropylammonium hydroxide, trimethylhydroxyethylammonium hydroxide, triethylhydroxypropylammonium hydroxide and triethylhydroxyethylammonium hydroxide), organic weak acid salts (e.g. trimethylhydroxypropylammonium acetate, trimethylhydroxyethylammonium acetate, triethylhydroxypropylammonium acetate and triethylhydroxyethylammonium acetate), tertiary amines (e.g. triethylamine, triethylenediamine, 1,5-diazabicyclo[4.3.0]nonene-5,1,8-diazabicyclo[5.4.0]-undecene-7 and 2,4,6-tris(dimethylaminomethyl)phenol), metal salts of alkylcarboxylic acids (e.g. acetic acid, caproic acid, caprylic acid, octyl acid, myristic acid and naphthenic acid), and the like, and combinations of two or more of such catalysts may be used.

According to preferred embodiments of the present invention, a trimerisation catalyst or catalysts from the group of alkali metal salts of carboxylic acids, such as potassium acetate or potassium 2-ethylhexanoate, may be selected.

The amount of the trimerisation catalyst used may be in the range of e.g. 0.01 to 0.5 wt %, preferably between 0.1 and 0.3 wt % based on the whole formulation of the coating, more preferably between 0.02 and 0.50 wt %, such as in the range of 0.1 to 0.2 wt %.

Preferably the catalyst may be blended with the isocyanate-reactive compound to achieve storage stability. Preferably the trimerisation catalyst is added to, e.g. dissolved in the compound containing isocyanate-reactive hydrogen atoms, which improves the mixing of the trimerisation catalyst with the polyisocyanate compound during reaction of the components providing the coating.

According to a second aspect of the present invention, a process for providing a polyisocyanurate-based coating for offshore applications is provided. The process comprises the steps of
  providing a surface to be coated;
  providing a polyisocyanate compound;
  providing a compound containing isocyanate-reactive hydrogen atoms;
  providing a trimerisation catalyst and hollow objects;
  combining said polyisocyanate compound and said compound containing isocyanate-reactive hydrogen atoms in such qamounts that the iso-index is at least 2000;
  bringing said polyisocyanate compound, said compound containing isocyanate-reactive hydrogen atoms, said trimerisation catalyst and hollow objects into contact with said surface and reacting said polyisocyanate compound, said compound containing isocyanate-reactive hydrogen atoms and said trimerisation catalyst thereby providing a polyisocyanurate-based coating.

The polyisocyanate compound, trimerisation catalyst and compound containing isocyanate-reactive hydrogen atoms, as well as any other optional component used during the process according to the second aspect of the present invention, are similar or even identical as the polyisocyanate compound, trimerisation catalyst and compound containing isocyanate-reactive hydrogen atoms described with regard to the polyisocyanurate-based coating according to the first aspect of the present invention.

A coating having the final dimension required, e.g. a thickness of e.g. 10 to 30 cm, can be provided in one run, having a curing time of e.g. only a few minutes. This is an advantage over other, e.g. epoxy-based, thermal insulating coatings used for offshore applications, e.g. thermal insulating coatings of pipelines for oil well drilling and exploitation. Such epoxy-based coatings are to be provided layer by layer, constituting the final coating of several centimeter thickness.

According to some embodiments of processes according to the present invention, the surface may be the outer surface of a pipe.

The coating may be provided as a one-shot coating, wherein the polyisocyanate compound, trimerisation catalyst and compound containing isocyanate-reactive hydrogen atoms are injected in a mould encompassing the part of the surface which is to be coated.

The coating may include heating of the pipe, e.g. by induction if appropriate. Bringing the pipe to be coated to a temperature of up to 80° C. may cause the activation of the trimerisation reaction.

The coating provided may have a thickness in the range up to 50 cm, typically in the range of 10 to 30 cm.

The use of the process according to the second aspect of the present invention may provide a surface of an object to be provided with a thermal insulating coating according to the first aspect of the present invention.

According to a further aspect of the present invention, a pipe for use as part of a pipeline suitable for offshore application is provided. The pipe according to this aspect of the present involution has an outer surface and at least one syntactic polyisocyanurate-based coating at said outer surface, said coating having a density of more than 0.6 g/cm$^3$ and a water uptake of less than 3.5%.

The coating may be a coating according to the first aspect of the present invention.

Preferably the coating may have a density of more than 0.5 g/cm$^3$.

The coating may be provided by means of a process according to the second aspect of the present invention.

The independent and dependent claims set out particular and preferred features of the invention. Features from the dependent claims may be combined with features of the independent or other dependent claims as appropriate.

The above and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

Figure 1:
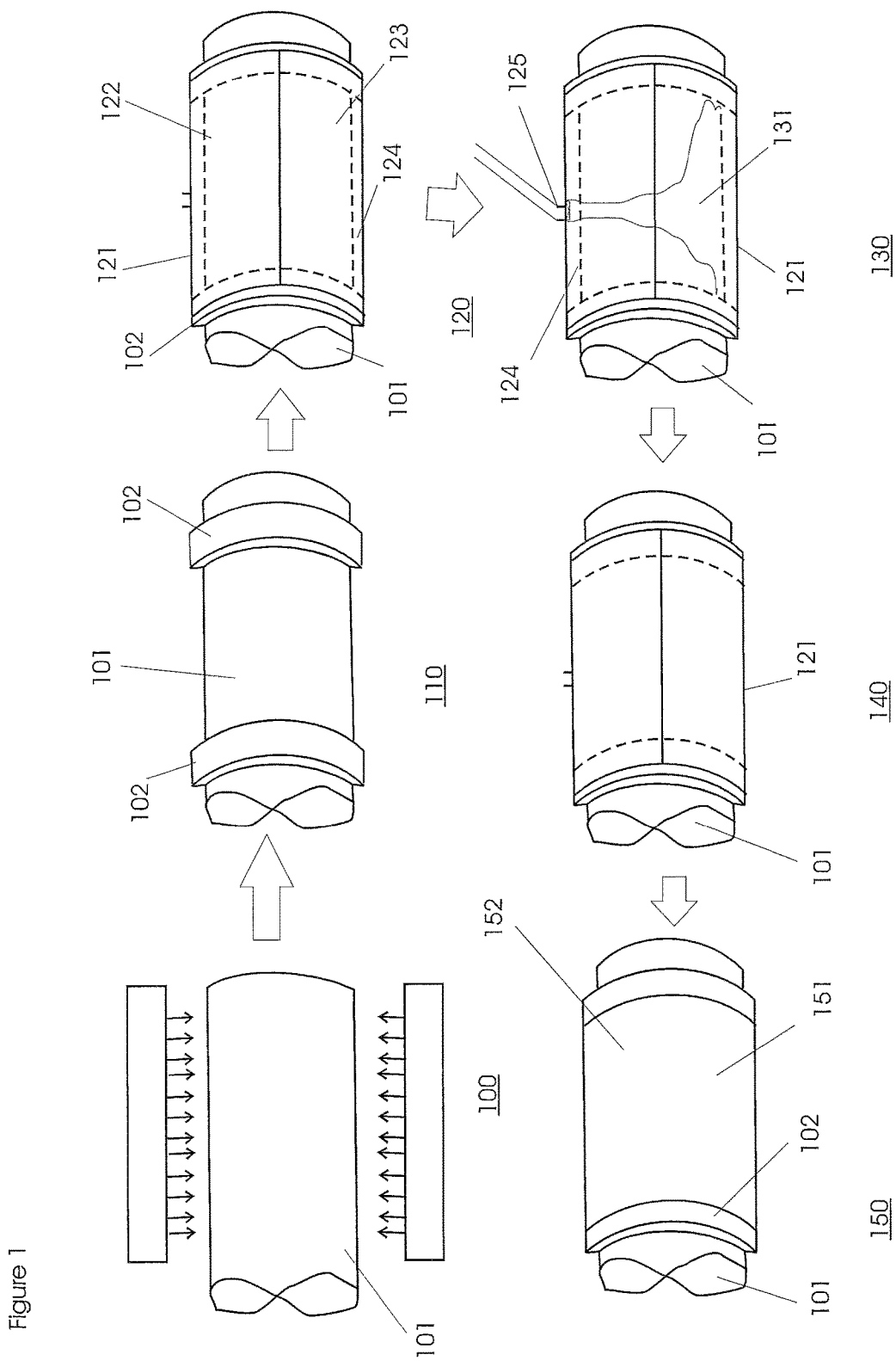
FIG. 1 is a schematical view of consecutive steps of a process for providing a pipeline suitable for offshore application according to the present invention.

The present invention will be described with respect to particular embodiments. It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Throughout this specification, reference to "one embodiment" or "an embodiment" are made. Such references indicate that a particular feature, described in relation to the embodiment is included in at least one embodiment of the present invention. Thus, appearances of the phrases "in one embodiment" or "in an embodiment" in various places throughout this specification are not necessarily all referring to the same embodiment, though they could. Furthermore, the particular features or characteristics may be combined in any suitable manner in one or more embodiments, as would be apparent to one of ordinary skill in the art from this disclosure.

The following terms are provided solely to aid in the understanding of the invention.

Syntactic coating is to be understood as a coating comprising hollow objects, typically of controlled size, such as hollow glass beads, embedded in a polymer matrix.

The "iso-index" or isocyanate index" is to be understood as the number of isocyanate groups of the polyisocyanate compound per 100 isocyanate-reactive hydroxyl groups of the isocyanate-reactive compound.

The "functionality" of a polyisocyanate or polyisocyanate compound, or the "isocyanate functionality", as such or as polymeric or prepolymeric polyisocyanates, refers to the average number of isocyanate groups per molecule, averaged over a statistically relevant number of molecules present in the polyisocyanate or polyisocyanate compound. In case the polyisocyanate compound comprises a plurality of different polyisocyanate components, the "isocyanate functionality" is equal to the average "isocyanate functionality" averaged over the plurality of different polyisocyanate components, taking into account the mass ratio of the plurality of different polyisocyanate components in said polyisocyanate compound.

The isocyanate content, isocyanate value or NCO-value, means the ratio, expressed in percentages, of the molar mass of the isocyanate groups in the isocyanate or polyisocyanate component over the total molar mass of the isocyanate or polyisocyanate component. In case the polyisocyanate compound comprises a plurality of different polyisocyanate components, the "isocyanate content, isocyanate value or NCO-value" is equal to the average "isocyanate content, isocyanate value or NCO-value" averaged over the plurality of different polyisocyanate components, taking into account the mass ratio of the plurality of different polyisocyanate components in said polyisocyanate compound.

The functionality of the isocyanate-reactive initiators or a component comprising isocyanate-reactive hydrogen atoms, is to be understood as the number of isocyanate-reactive hydrogen atoms per molecule initiator or per molecule component comprising isocyanate-reactive hydrogen atoms. In the case of a plurality of isocyanate-reactive initiators or a compound comprising a plurality of different components comprising isocyanate-reactive hydrogen atoms, this functionality is equal to the averaged functionality, averaged over the plurality of isocyanate-reactive initiators or the plurality of different components comprising isocyanate-reactive hydrogen atoms, taking into account the mass ratio of the plurality of isocyanate-reactive initiators or the plurality of different components comprising isocyanate-reactive hydrogen atoms present.

With hydroxyl value of a component comprising isocyanate-reactive hydroxyl atoms is meant the value obtained using the formula:

$$OH=(56.1*1000*\text{functionality of the component}/\text{molar weight of the component})$$

With EO content of a component comprising isocyanate-reactive hydroxyl atoms means the part, expressed in weightl-percentage, of ethylene oxide, as compared to the total amount of the component comprising isocyanate-reactive hydroxyl atoms.

The term DMTA modulus at a given temperature refers to the Young's modulus at this temperature, typically either room temperature of 23° C. or at 150° C., measured using the dynamic mechanical thermal analysis (DMTA) technique, ISO/DIN 6721-5 for measuring DMA in flexural mode, performed on a TA DMA 2980 device.

EXAMPLE

According to the present invention, a number of different coatings were provided according to a formulation as set out in table 1.

TABLE 1

| ref. | ISO type | Polyol type | Catalyst and amount (% wt) | EO (%) | Iso func- tion- ality | ISO index | NCO value (%) |
|---|---|---|---|---|---|---|---|
| I* | MDI based prepolymer | polyether ethylene oxide tipped triol | 0.2% Dabco TMR | 15 | 2.2 | 960 | 19.3 |
| II | MDI based | polyether ethylene oxide tipped triol | 0.2% Dabco TMR | 15 | 2.5 | 2250 | 31.4 |
| III | MDI based prepolymer | polyether ethylene oxide tipped triol | 0.2% Dabco TMR | 15 | 2.1 | 2000 | 27.5 |
| IV | MDI based prepolymer | polyether ethylene oxide tipped triol | 0.2% Dabco TMR | 15 | 2.3 | 2058 | 28.6 |
| V* | MDI based prepolymer | polyether ethylene oxide tipped triol | 0.2% Dabco TMR | 15 | 2.2 | 620 | 13.0 |

*comparative coatings

The components are combined and used to provide a coating on e.g. a steel pipe, to be used for exploitation of deep sea oil wells. Some properties are set out in table 2.

TABLE 2

| ref. | Density (g/cm$^3$) | Thermal conductivity (W/mK) | DMTA modulus at 23° C. (MPa) | DMTA modulus at 150° C. (MPa) | Water uptake after 1000 h at 90° C. (%) |
|---|---|---|---|---|---|
| I* | 0.9 | 0.126 | 400 | 120 | 9.0 |
| II | 0.9 | 0.118 | 1200 | 1100 | 3.8 |
| III | 0.9 | 0.112 | 960 | 840 | 4.2 |
| IV | 0.9 | 0.105 | 1000 | 900 | 1.8 |
| V* | 0.9 | / | 110 | 30 | 14 |

*comparative coatings

An example of a process for providing a polyisocyanurate-based coating on a surface of, in this particular example the outer surface of, a pipe of a pipeline, is illustrated in FIG. 1.

In a first step 100, a pipe 101 is heated and brought to a temperature of about 80° C.; this may be done e.g. by induction or radiant heating. The pipe 101 is provided in step 110 with two end fittings 102, one at each side. In step 120, the pipe 101 with end fittings 102 is enclosed by a mould 121, such as in this embodiment, between two shells 122 and 123 of a tubular mould. The mould defines a space 124 in which the coating is to be cured.

The space 124 of the mould 121 is filled, as is shown in step 130 with the coating material 131 having a formulation as set out above. The coating material 131 may e.g. be provided in the mould 121 via an inlet 125.

The mould 121, including the pipe 101 and the coating material 131 is given time in order to cure the coating material 131 in the mould 121, as is shown in step 140.

After curing, the mould 121 is removed in step 150, and the so-obtained demoulded pipe 152 comprises the pipe 101 and end fittings 102, which pipe outer surface is provided with a coating 151.

Figure 2:
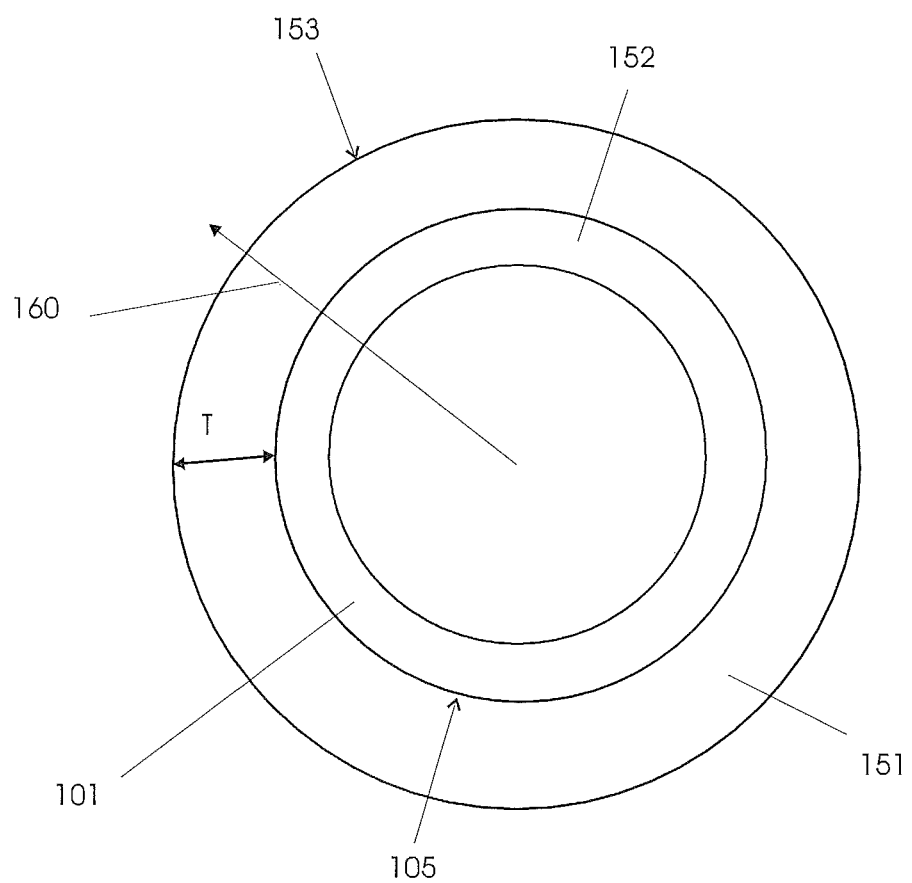
FIG. 2 is a schematical view of a radial cross section of a pipe being part of a pipeline suitable for offshore application according to the present invention.

The resulting pipe 152, of which a radial cross section is shown in FIG. 2, may form part of a pipeline suitable for offshore application. The pipe has an outer surface 153 which is provided by the polyisocyanurate-based coating 151. The coating may have a density of more than 0.6 g/cm$^3$ and a water uptake of less than 3.5%. The thickness T of the coating, this is the largest distance between the surface 105 of the pipe 101 and the outer surface 153 of the coating 151 in radial direction 160, may range up to 50 cm, e.g. from 10 to 30 cm. The formulations as set out in the table 1 above may be used to provide the coating, providing the properties as set out in table 2 as well.

It is to be understood that although preferred embodiments and/or materials have been discussed for providing embodiments according to the present invention, various modifications or changes may be made without departing from the scope and spirit of this invention.

The invention claimed is:

1. A polyisocyanurate-based syntactic coating composition obtained by reacting a polyisocyanate compound with a compound containing isocyanate-reactive hydrogen atoms in the presence of a trimerisation catalyst and hollow objects, characterised in that the isocyanate index of the reaction is ≥2050 and the resulting coating has a water uptake of less than 5%, an elongation of more than 10% and a thermal insulating property of less than 0.18 W/mk, and the density of the coating composition is between 0.9 g/cm$^3$ and 1.5 g/cm$^3$ and wherein the compound containing isocyanate-reactive hydrogen atoms having an ethylene oxide content ranging from 5 wt. % to 30 wt. % is a polyether polyol selected from a polyethylene glycol, polypropylene glycol, polypropylene glycol-ethylene glycol copolymer, polytetramethylene glycol, polyhexamethylene glycol, polyheptamethylene glycol, polydecamethylene glycol and a polyol obtained by ring-opening copolymerisation of an alkylene oxide with an isocyanate-reactive initiator of functionality 2 to 8 or a polyester polyol obtained from the reaction of a polyhydric alcohol and a polybasic acid.

2. The polyisocyanurate-based coating composition according to claim 1, wherein the isocyanate index is in the range of 2050 to 7000.

3. The polyisocyanurate-based coating composition according to claim 1, wherein the hollow objects are hollow glass beads.

4. The polyisocyanurate-based coating composition according to claim 1, wherein the compound containing isocyanate-reactive hydrogen atoms has an ethylene oxide content of 5 to 15 wt. %.

5. A pipe for use as part of a pipeline suitable for offshore application, the pipe having an outer surface and at least one syntactic polyisocyanurate-based coating at said outer surface, said coating being as defined in claim 1 and having a water uptake of less than 3.5%.

6. The polyisocyanurate-based coating composition according to claim 2, wherein the isocyanate index is in the range of 2050 to 4000.

* * * * *